United States Patent [19]

Nakamura

[11] 4,414,627
[45] Nov. 8, 1983

[54] MAIN MEMORY CONTROL SYSTEM

[75] Inventor: Teruo Nakamura, Tokyo, Japan

[73] Assignee: Nippon Electric Co., Ltd., Tokyo, Japan

[21] Appl. No.: 296,978

[22] Filed: Aug. 27, 1981

Related U.S. Application Data

[63] Continuation of Ser. No. 54,176, Jul. 2, 1979, abandoned.

[30] Foreign Application Priority Data

Jul. 3, 1978 [JP] Japan .................. 53-81321

[51] Int. Cl.$^3$ ............................................. G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,772,650 | 11/1973 | Hilberg ................. | 364/900 |
| 3,787,813 | 1/1974 | Cole et al. ............ | 364/200 |
| 3,882,470 | 5/1975 | Hunter .................. | 364/900 |
| 3,967,248 | 6/1976 | Kjöller et al. ......... | 364/200 |
| 4,025,903 | 5/1977 | Kaufman et al. ..... | 364/200 |
| 4,037,215 | 7/1977 | Birney et al. ......... | 364/200 |
| 4,042,911 | 8/1977 | Bourke et al. ........ | 364/900 |
| 4,051,460 | 9/1977 | Yamada et al. ....... | 364/200 |
| 4,080,652 | 3/1978 | Cronshaw et al. ... | 364/200 |
| 4,089,063 | 8/1978 | Takezono et al. .... | 364/200 |
| 4,150,428 | 4/1979 | Inrig et al. ............ | 364/200 |

OTHER PUBLICATIONS

IBM Tech. Disc. Bull., "Address Skip-A Means for Utilizing Imperfect Storage", Sakalay, vol. 20, No. 5, Oct. 1977, pp. 1841-1842.

*Signetics Data Manual*, (1976 Signetics Corporation), "Dual 4-line to 1-line Data Selector/Multiplexer", p. 214.

Thurber & Patton, *Data Structure and Computer Architecture—Design Issue at the Hardware/Software Interface*, (1977) D.C. Heath & Co.), pp. 60-68.

Randall & Kuehner, Dynamic Storage Allocation System In Communications of the ACM, vol. 11, No. 5, Association for Computing Machinery, May 1968, pp. 297-306.

Katzen, Jr., Computer Organization and the System/370, 1971, Computer Science Series, Van Nostrand Reinhold Company, pp. 286-292.

*Primary Examiner*—Eddie P. Chan
*Attorney, Agent, or Firm*—Fitzpatrick, Cella, Harper & Scinto

[57] ABSTRACT

A main memory control system reconstructs the main memory following DP system failure to ensure continuous logical address to operative physical memory mapping so that the DP system can be restarted using a rescue type initial program load. An address converting table has word registers addressable by logical address for storing the respective preassigned physical unit memory addresses and corresponding flags to indicate whether the unit memories are operative. Prior to DP system restart, the words of the address converting table are shifted among the registers to reallocate the real addresses of nonfunctioning unit memories to the read address of functioning unit memories.

2 Claims, 9 Drawing Figures

MAIN MEMORY CONTROL SYSTEM

This is a continuation of application Ser. No. 54,176, filed July 2, 1979, now abandoned.

BACKGROUND OF THE INVENTION

1. Field of the Invention

The present invention relates to a main memory control system for controlling the configuration of a plurality of unit memories in a main memory for use in a data processing system.

2. Description of Prior Art

The configuration of a main memory forming a part of a conventional data processing (DP) system is achieved by using software instructions. An address space of the main memory with this memory configuration is, however, not always continuously connected over the entire memory area from the minimum logical address to the maximum logical address in the address space of the main memory at any given time. For example, in a specific part of the address space, a unit memory (e.g. block of memory, page etc.) in the main memory which has initially been allocated to correspond to a logical address is often disconnected from the DP system because of some trouble or failure of the unit memory, resulting in the discontinuity of the address space in the main memory.

Such discontinuities in the address space (i.e. in the mapping of the sequence of logical addresses to physical memory locations) can present problems when a DP system is interrupted during operation by troubles in the central processing unit (CPU), the input/output (I/O) control unit, the main memory, and the I/O devices due to power failure, abnormal temperature, fire flood, lightning, of earthquake. After the trouble is cured, the operating system is restarted (by a procedure commonly called a "restart" or "rescue" routine) so as not to effect various services. To this end, a rescue type initial program load command is executed in the DP system so that operation can be resumed from the last rescue point. However, at this time point, the continuity of the address space of the main memory is not ensured as described above. Execution of the rescue routine requires the mapping of the sequence of logical addresses to operative unit memories to be continuous. Therefore, it is impossible to perform the rescue type initial program load (RIPL) command for all the memory areas of the main memory connected in the DP system unless the main memory is reconstructed by using software instructions. For this purpose, before the execution of the RIPL command, the main memory must be reconstructed by using software instructions in order to ensure the continuous address space. Alternatively, the RIPL command is executed for each separate unit memory where a continuous address space is ensured. The main memory is then reconstructed or reallocated by the software instructions loaded in response to the RIPL command.

An object of the present invention is, therefore, to provide a novel hardware structure of a main memory control system which can execute the RIPL for all the memory areas connected in the DP system before said program load operation is performed.

SUMMARY OF THE INVENTION

According to one aspect of the present invention, there is provided a main memory control system responsive to first address information including an address number and an in-unit memory address given from a central processor unit and/or an input/output controller comprising:

a main memory having a plurality of unit memories to which unit memory numbers are attached, respectively;

an address converter having memory means for storing a first set of data each representing a unit memory number responsive to the first address information which is applied from the central processor unit and/or the input/output controller to make access to the main memory, so that the first address information may be converted into second address information including said unit memory number and said in-unit memory address, and a second set of data each indicating whether each of said first data set is effectively converted into one of the unit memories;

means responsive to a rescue type initial program load command given from the central processor unit for controlling said address converter and said main memory to allocate continuous addresses to all the first data which are designated to be effective by said second data set.

BRIEF DESCRIPTION OF THE DRAWINGS

Other objects and features of the invention will be apparent from the following detailed description when the same is taken in connection with the accompanying drawings, in which.

DESCRIPTION OF THE PREFERRED EMBODIMENT

Figure 1A:
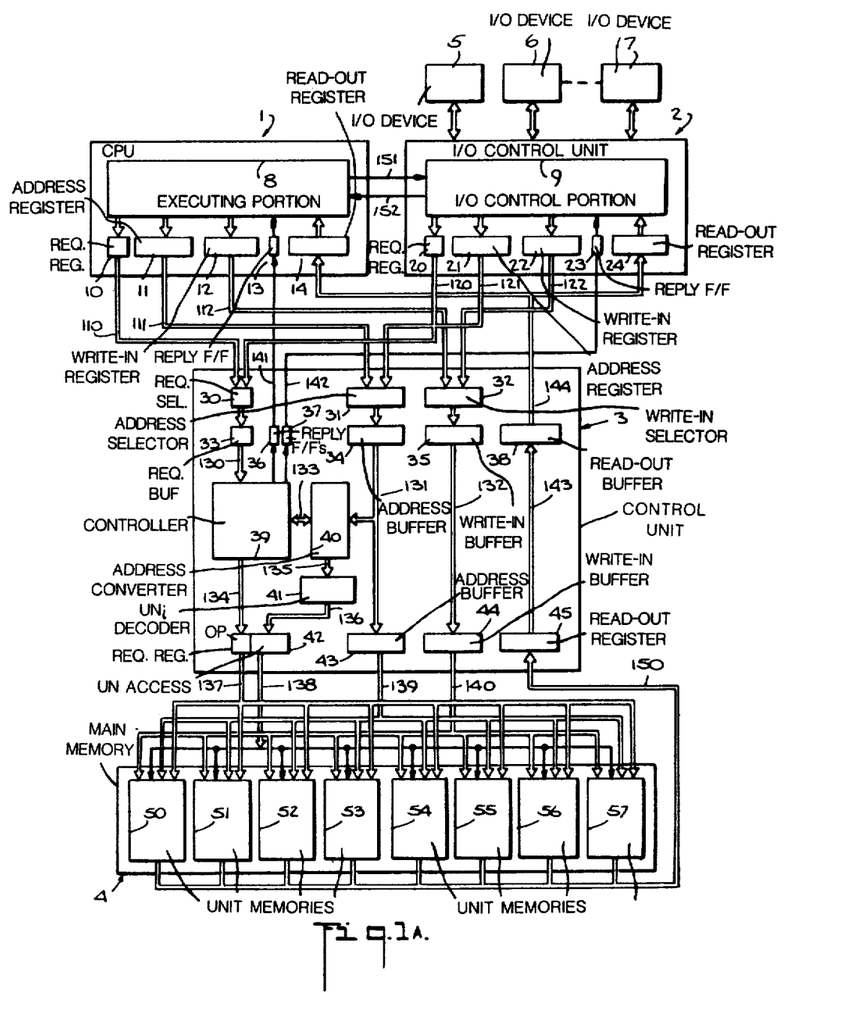
FIG. 1A shows a block diagram of a DP system to which one embodiment of the invention is applied.

Referring now to FIG. 1A, a DP system includes a CPU 1, an I/O control unit 2, and a main memory control system according to the invention which consists of a control unit 3 and a main memory 4. The I/O control unit 2 is coupled with I/O devices 5 to 7. An access request control operation of access to the main memory 4 is as follows: In response to access requests from the CPU 1 and I/O control unit 2, an executing portion 8 of the CPU 1 and an input/output control portion 9 of the I/O control unit 2 generate kinds of access requests, real addresses for accessing the main memory 4, and the write-in data to be written into the main memory 4. These data are then set in request registers 10 and 20, address registers 11 and 21, and write-in data registers 12 and 22, respectively. The data set in said registers respectively are transferred through control data paths 110 and 120, address paths 111 and 121, and data paths 112 and 122 into a request selector 30, an address selector 31, and a write-in data selector 32 in the control unit 3, respectively, to thereby control access to the main memory 4. The selectors 30, 31 and 32 select the I/O controller 2 prior to the CPU 1 so that the data transferred from the request register 20, the address register 21 and the write-in data register 22 are set in a request buffer register 33, an address buffer register 34, and a write-in buffer register 35, respectively. Next, the operation-designating data set in the request buffer register 33 is transferred through a path 130 to a controller 39 and is decoded to be a read-out and write-in instruction. As a result, the following operation may be performed under control of the controller 39. First, the content of the address number portion in the address buffer register 34 is transferred through an address path 131 to an address converting apparatus 40 where the address number is converted into a corresponding unit memory number. Then, an access request directed to eight unit memories 50 to 57 in the main memory 4 is set in a request register 42 through a path 135, a unit memory number decoder 41, and a path 136. An 8-bit access request corresponding to the eight unit memories in the main memory is stored in the request register 42 and is directed to the corresponding unit memory through a path 138. The operation-designating data directed to the main memory 4 passes through the controller 39 and a path 134 and is given to the request register 42. The operation-designating data retained in the request register 42 is distributed to all the unit memories. The address portion of the unit memory within the address buffer register 34 is transferred via a path 131 to an address buffer register 43 simultaneously with updating the request register 42. The address portion is then distributed through an address path 139 to all the unit memories. Similarly, the write-in data set in the write-in data register 35 is transferred to a data buffer register 44 through a path 132 and then is supplied through a data path 140 to all the unit memories.

Next, in the main memory 4 having received the access request, one unit memory (one of the unit memories 50 to 57) specified by the request register 42 performs the operation designated through the control path 137. If the access request is a read-out request, the data read out from the specified unit is transferred to a read-out data register 45, by way of a read-out data path 150 and further is set in a data buffer register 38 via a path 143 under control of the controller 39. When the read-out data is set in the read-out data buffer 38, a reply flip-flop 36 or 37 is set. The reply data is set in the read-out data register 14 or 24 via a read-out data path 144 and is set in a reply flip-flop 13 or 23 through a reply control path 141 or 142.

When the access request is a write-in request, the reply flip-flop 36 or 37 is set as soon as the operation based on the request transferred from the control unit 3 to the main memory 4 is accomplished. The reply to the CPU 1 and the I/O controller 2 is performed as in the case of the read-out request.

Figure 1B:
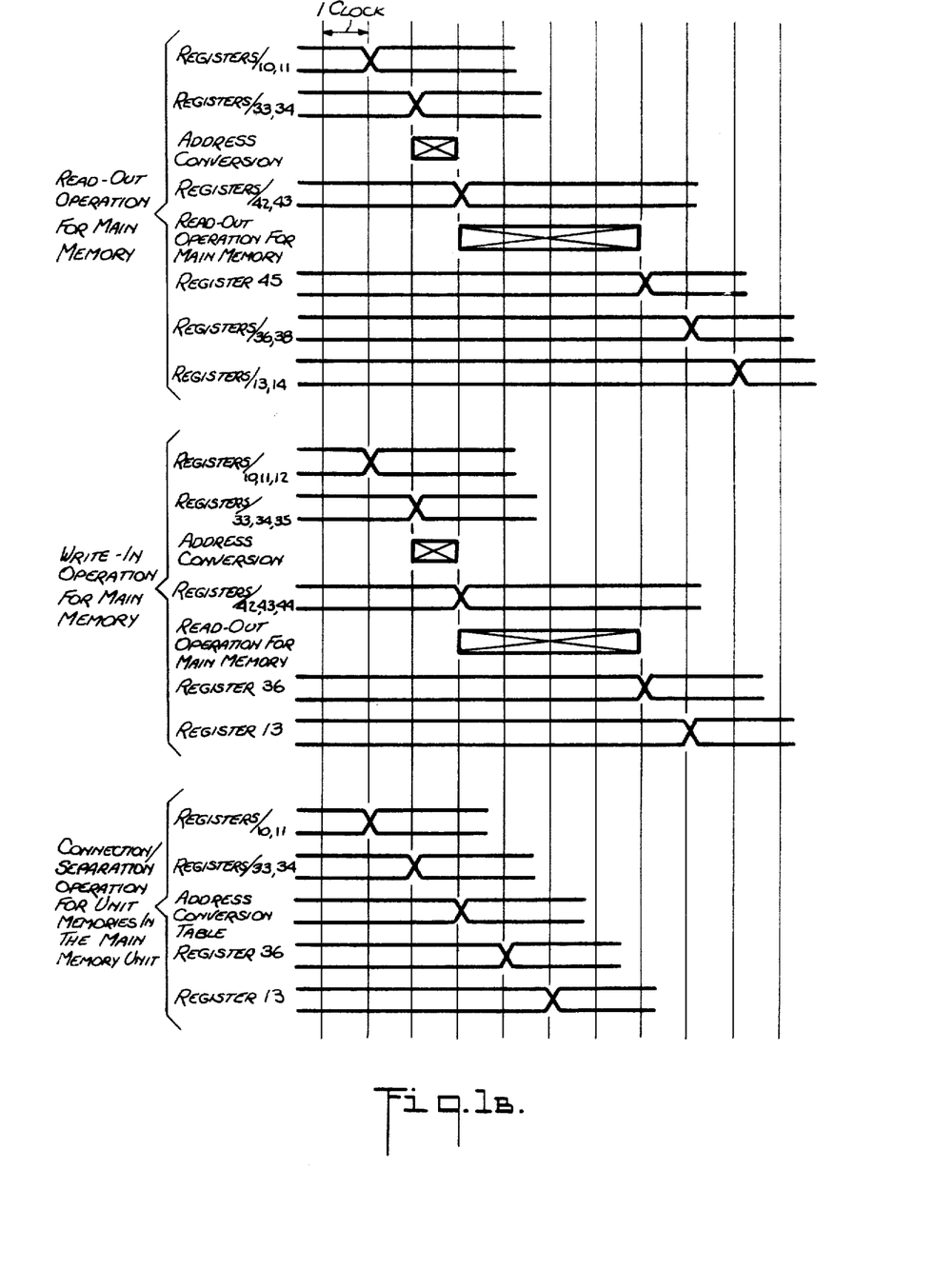
FIG. 1B shows a timing chart describing the operations of the main parts of the system shown in FIG. 1A.

FIG. 1B shows a timing chart for describing the operation of the main memory access control in the main memory control system shown in FIG. 1A. Connection and disconnection of the unit memories to and from the DP system will be described later.

Figure 2A:
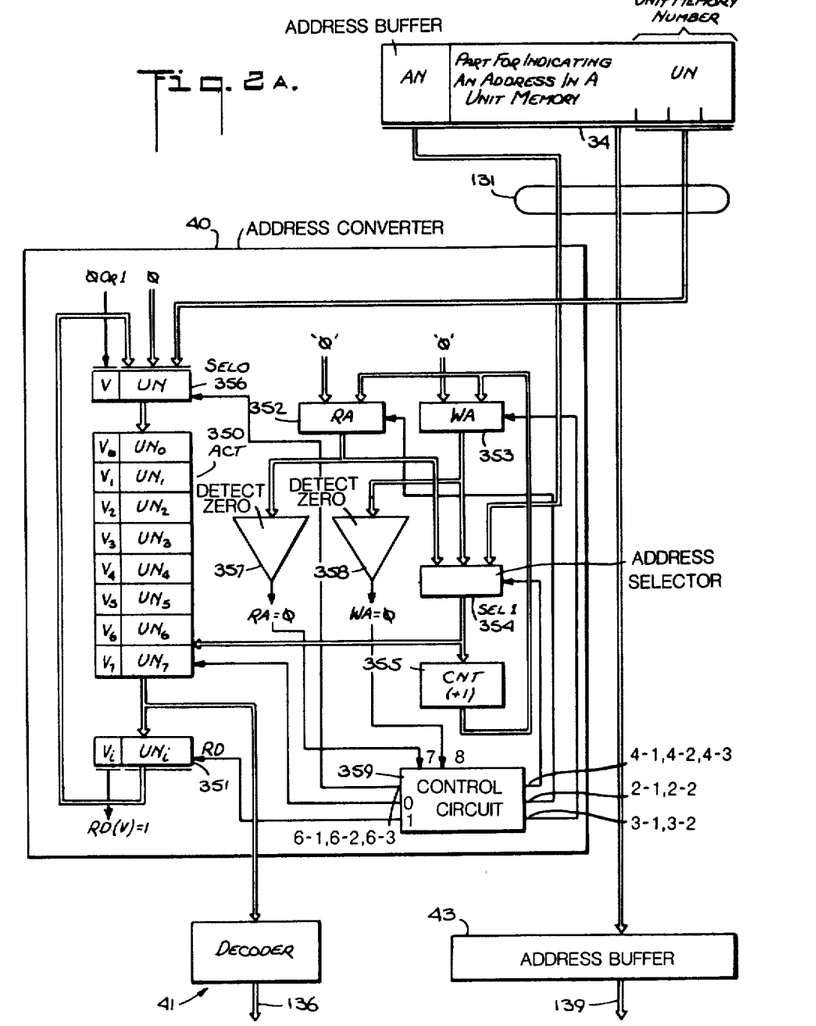
FIG. 2A shows a block diagram of an address converting apparatus for use in the invention.
Figure 2B:
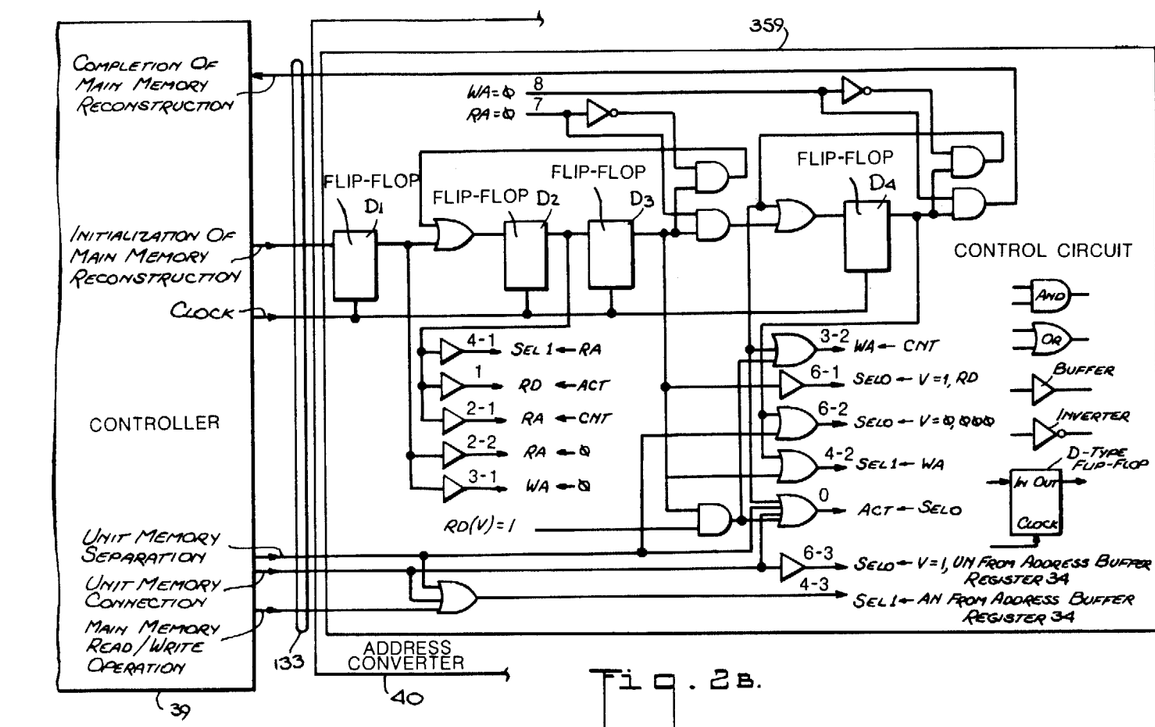
FIG. 2B shows a control circuit diagram of the address converting apparatus shown in FIG. 2A.
Figure 3A:
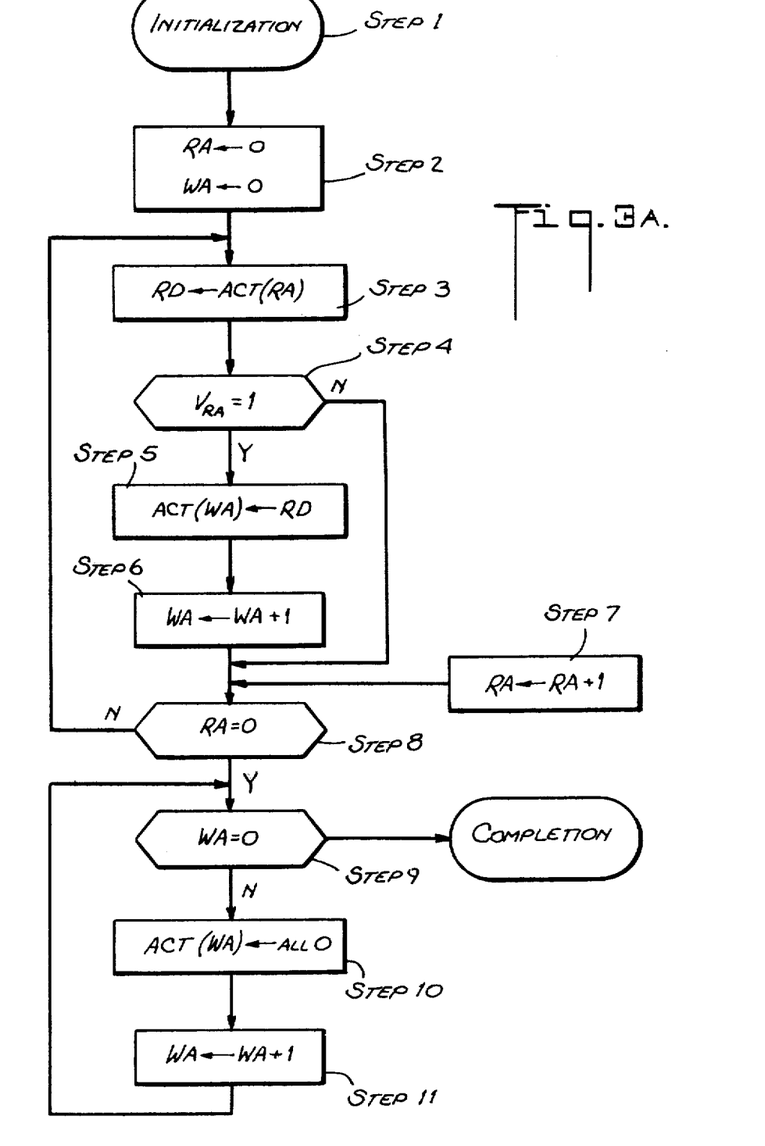
FIGS. 3A and 3B respectively show a flow-chart and a timing chart describing the operations of the address converting apparatus.
Figure 3B:
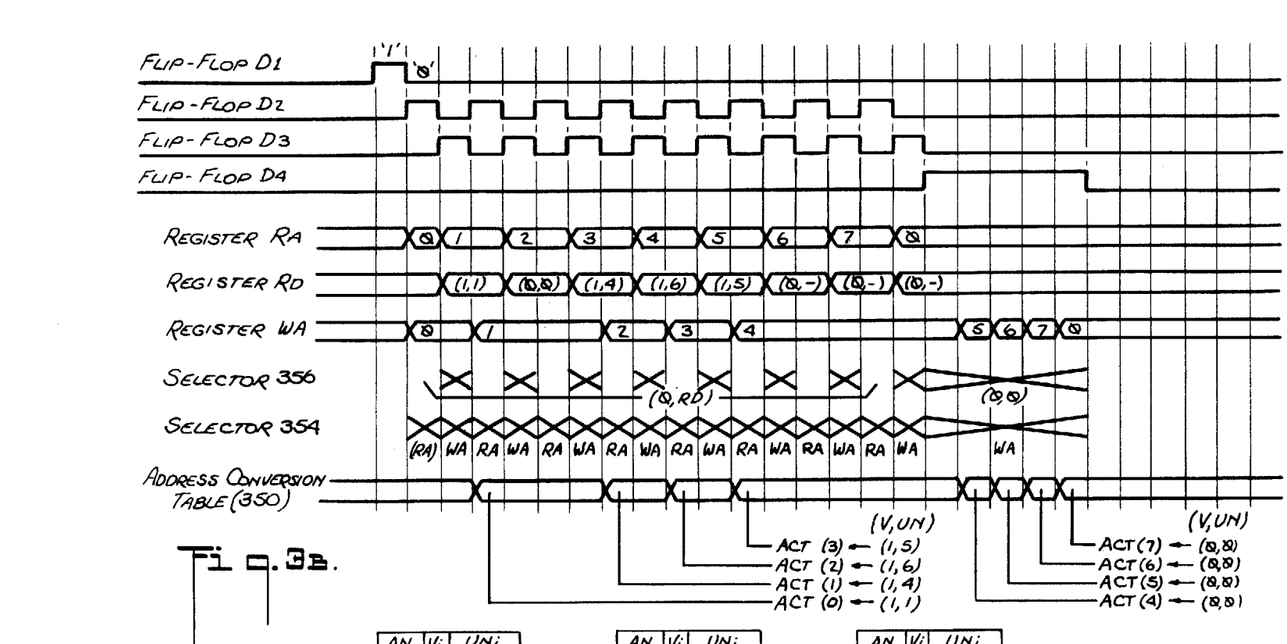

Turning now to FIG. 2A and FIG. 2B, an address converting apparatus used in the main memory control system has an address converting table (ACT) 350 which is a memory containing eight words each of which is addressed by an address number (ANi). The content of each word contains the unit memory number ($UN_i$) of the unit memory corresponding to the address number and the bit(s) $V_i$ indicating whether the unit memory corresponding to the address number is connected or not to the DP system. The table 350 is connected to a write-in data selector (SELO) 356, a read-out register (RD) 351, and an address selector (SEL1) 354. The unit memory number derived from the read-out register 351 and another unit memory number derived from the address buffer register 34 through an address path 131 are applied to the inputs of the write-in data selector 356 in response to a control signal from a control circuit 359 on line 6-3 thereof. As an address for the converting table 350, besides the address number (AN) transferred through the address path 131 from the buffer register 34, the content of a read-out address (RA) register 352 or a write-in address register (WA) 353 is selectively supplied through the selector 354 in response to a control signal on line 4-3. The output of the selector 354 which is used as an address for the converting table 350 is applied to a counter 355 which performs a +1 counting-up operation. The output of the counter 355 is given to the read-out address register 352 and the write-in address register 353. The address registers 352 and 353 are further coupled with zero detectors 357 and 358, respectively.

Referring now particularly to FIG. 2B, which shows the control circuit 359 for controlling the address converting apparatus 40, arrows directed to the left e.g. WA←CNT indicate that the contents of the registers and the counters at the heads of the arrows are set to the registers indicated by the tails of the arrows or are selected by means of the selectors indicated by the tails of the arrows (e.g. WA is set to the value of the CNT register).

With the present main memory control system, the read-out and the write-in address registers 352 and 353, and the counter 355 are mainly used to render continuous the addresses in the main memory.

Figure 4:
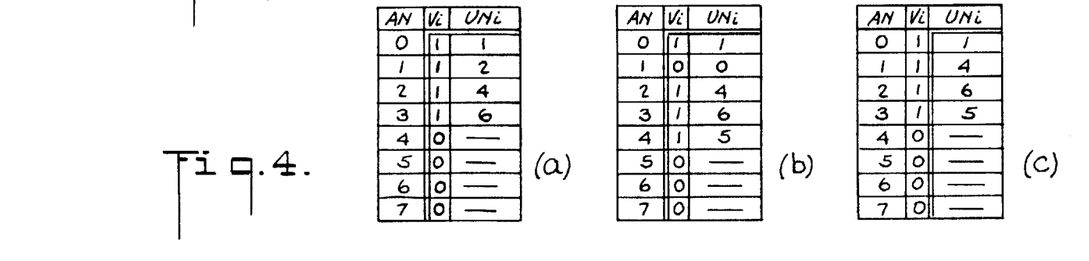
FIGS. 4(a) to (c) are diagrams illustrating how continuous addresses in effective unit memories in the main memory are allocated.

The operation of the address converting apparatus responsive to the RIPL command will be described in detail with reference to particularly FIGS. 3A and 3B and FIGS. 4(a) to (c). In the case of FIG. 4(a), real addresses are continuously allocated in the memory area of the main memory 4. As shown, address numbers 0, 1, 2, and 3 are assigned to the unit memories 51, 52, 54, and 56 having the unit memory numbers 1, 2, 4, and 6, respectively. In this case, only those four unit memories are connected to the DP system employing the present main memory control system. In FIG. 4(b), the unit memory 55 with the unit memory number 5 located at the address number 4 is additionally connected to the DP system, and the unit memory 52 with the unit memory number 2 is disconnected form the DP system for some reason. The address allocation is thus discontinuous or split at the address number 1. FIG. 4(c) shows an address allocation when the addresses shown in FIG. 4(b) are reallocated to become continuous.

To reallocate the address allocated as shown in FIG. 4(b) to that shown in FIG. 4(c), the RIPL command is issued from the instruction execution part 8 in the CPU shown in FIG. 1A to the control unit 39 via the request register 10. Upon receipt of the command, the control unit 39 provides a main memory reconstruction start signal (FIG. 2B) to the control circuit 359 of the address converting apparatus 40 through the path 133 (step 1 in the flow chart shown in FIG. 3A). As a result of the step 1, a flip-flop D1 in FIG. 2B is set to render '0' the read-out and write-in address registers 352 and 353 (step 2). Then, the content of the address converting table (ACT) 350 specified by the content '0' of the address register 352, that is to say, the content at the address location in FIG. 4(b), is read-out and set to the read-out register 351 (step 3) in response to control signals on lines 4-1 and 1. Then, it is checked as to whether a connection-indicating bit V is checked (step 4). If the connection-indicating bit V is '1', the content of the register 351 is given in response to control signals on lines 6-1 and 0, to the memory location at the address number (AN)0 in the converting table 350 which is specified by the content '0' of the write-in address register 353 (step 5). Then, '1' is added to the content of the write-in address register 353 (step 6) in response to a control signal on line 3-2. When the connection-indicating bit V is '0', '1' is added to the content of the address register 352 (step 7) in response to a control signal on line 2-1 and the program execution returns to the step 3 to read-out the content of the address converting table 350.

The above-mentioned operation is performed eight times. In other words, when the zero detector 357 in FIG. 2A detects that the content of the register 352 is '0', a signal is sent on line 7 to Control Circuit 359, and the address allocation shown in FIG. 4(c) relating to the address numbers 0, 1, 2, and 3 is formed (step 8). Then, in the next step 9, the content of the write-in address register 353 is checked by way of line 8. If the content of the register 353 is not '0', that is, it does not become '0' after +1 operation for the register 352 has been repeated eight times, all '0' are written in response to a control signals on lines 6-2 and 0, into the word in the converting table 350 specified by the address register 353 (step 10) the contents of which is loaded into the address selector 354 in response to a control signal on line 4-2. Following this, '1' is added to the content of the write-in address register 353 (step 11) in response to a signal on line 3-2. This operation is repeated until the content of the register 353 becomes '0' (in other words, at this point in time, the zero detector 358 in FIG. 2A detects zero and a signal is sent on line 8 to Control Circuit 359. At the same time, the remaining words in the address converting table 350 whose connection-indicating bits V are '0' are set up.

It is to be noted that, each of the selectors 30, 31, 32, 354, and 356 may be composed of the selector of the type described on page 214 in an publication entitled "Signetics Data Manual" publishd by Signetics Corporation in 1976.

As described above, according to the present system, the initial setting of program into the main memory is possible by fixing the unit memory UNi=1 with the minimum address and the unit memory UNi=5 with the maximum address, as shown in FIGS. 4(a) and (b), and using the addresses in the vicinity of the minimum and the maximum addresses. Therefore, the program loading may be flexibly achieved.

Thus, the program loading for all the unit memories engaged in operation with the DP system may easily be made by reallocating the unit memories in the main memory so that the real address space is continuous at the time of the rescue type initial program load.

Although various aspects of our invention have been described and illustrated in detail by way of example, it is to be understood that the same is not by way of limitation. The sprit and scope of our invention is limited only by the terms of the appended claims.

What is claimed is:
1. A data processing system comprising
a central processing unit,
a main memory having a plurality of unit memories each of which is accessible by means of a unit memory number address,
an input/output control unit connected to said central processing unit and to said main memory for performing data transfer between said main memory and external devices,
said central processing unit having an instruction execution portion arranged to produce a rescue type initial program load command signal following interruption of operation of the system in order to reconstruct the main memory to ensure continuous address space, and
a main memory control unit connected to receive from said central processing unit, and from said input/output control unit, address numbers and unit memory number addresses preassigned to corresponding address numbers, together with associated bits indicating whether the unit memory represented by each unit memory number address is operative, said main memory control unit being connected to receive from said central processing unit said rescue type initial program load command signal to reallocate unit memory number addresses with respect to said address numbers, said main memory control unit comprising an address converting apparatus having an address converting table comprising a plurality of storage locations for said unit memory number addresses and associated indicating bits, each of said storage locations being accessible by means of a address converting table storage location address number,
means connected to receive from said central processing unit and said input/output control unit said unit memory number addresses preassigned to the respective address numbers together with associated bits indicating whether the unit memory represented by each unit memory number address is operative and for storing said unit memory number addresses in the respective storage locations of said address converting table,
shifting means connected to receive said rescue type initial program load command signal from said central processing unit and, in response thereto, to perform a reconstruction operation in which the unit memory number addresses which have been stored in said storage locations are shifted therein to ensure continuous storage space, and shifting means comprising:
read-out means and write-in means, each individually connected to said address converting table and responsive to the address number for sequentially applying address converting table storage location address numbers to said address converting table to sequentially access the different storage locations therein,
a read-out register connected to said address converting table to receive the unit memory number address and its associated indicating bit from the storage location in said address converting table accessed by said read-out means,
a write-in register means connected to said read-out register and to said address converting table to receive from said read-out register each unit memory number address having an associated indicating bit which indicates the operative condition of the respective unit memory and to write said unit memory number address into the storage location which is accessed by said write-in means and not to write into said address converting table any unit memory number address having an associated indicating bit which does not indicate the operative condition of the respective unit memory and sequencing means connected to said read-out means and said write-in means and programmed to cause said read-out means to sequentially access the different storage locations of said address converting table in succession upon each read-out operation by said read-out means and to cause said write-in means to sequentially access different storage locations of said address converting table in succession upon each write-in operation by said write-in means whereby said storage locations of said address converting table are accessed sequentially according to the order of the address numbers so that the unit memory number addresses to which said address numbers are assigned are arranged in the storage locations of said address converting table according to said order of address numbers.

2. A main memory control as defined in claim 1, wherein said address converting table storage locations each comprises a register including bit storage positions for storing data.

* * * * *